Jan. 26, 1943.     S. J. HARLEY ET AL     2,309,313
MEANS FOR PRODUCING RELIEF IN SCREW THREADS
Filed March 11, 1941     5 Sheets-Sheet 1
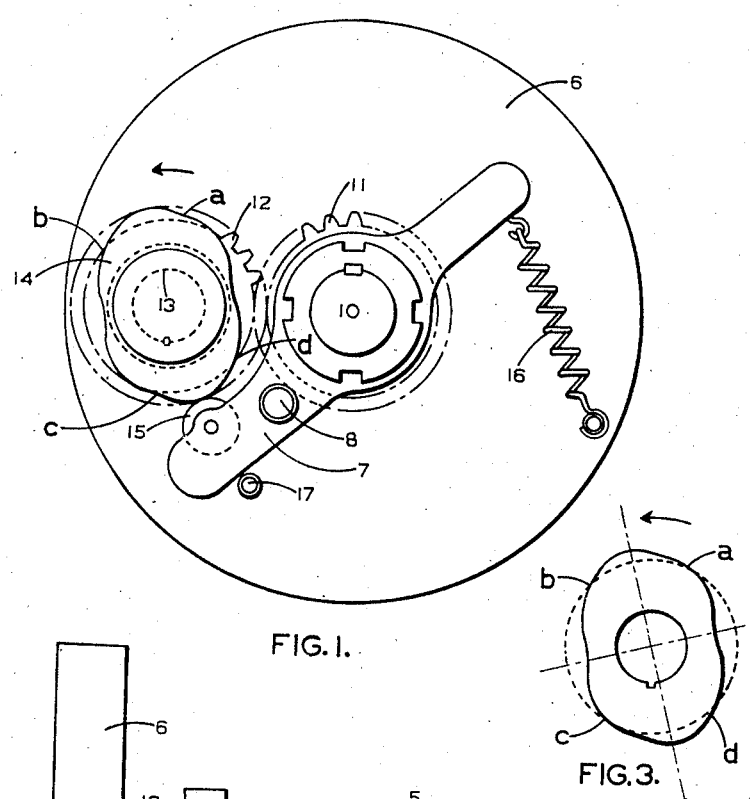
FIG. 1.
FIG. 3.
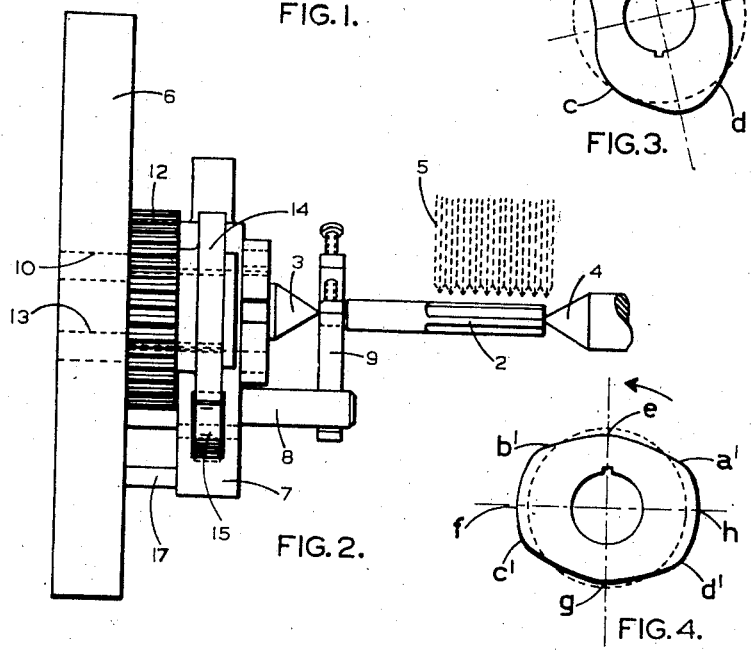
FIG. 2.
FIG. 4.
Inventors
Stanley J. Harley
John E. Wainwright
By Babcock & Babcock
Attorneys

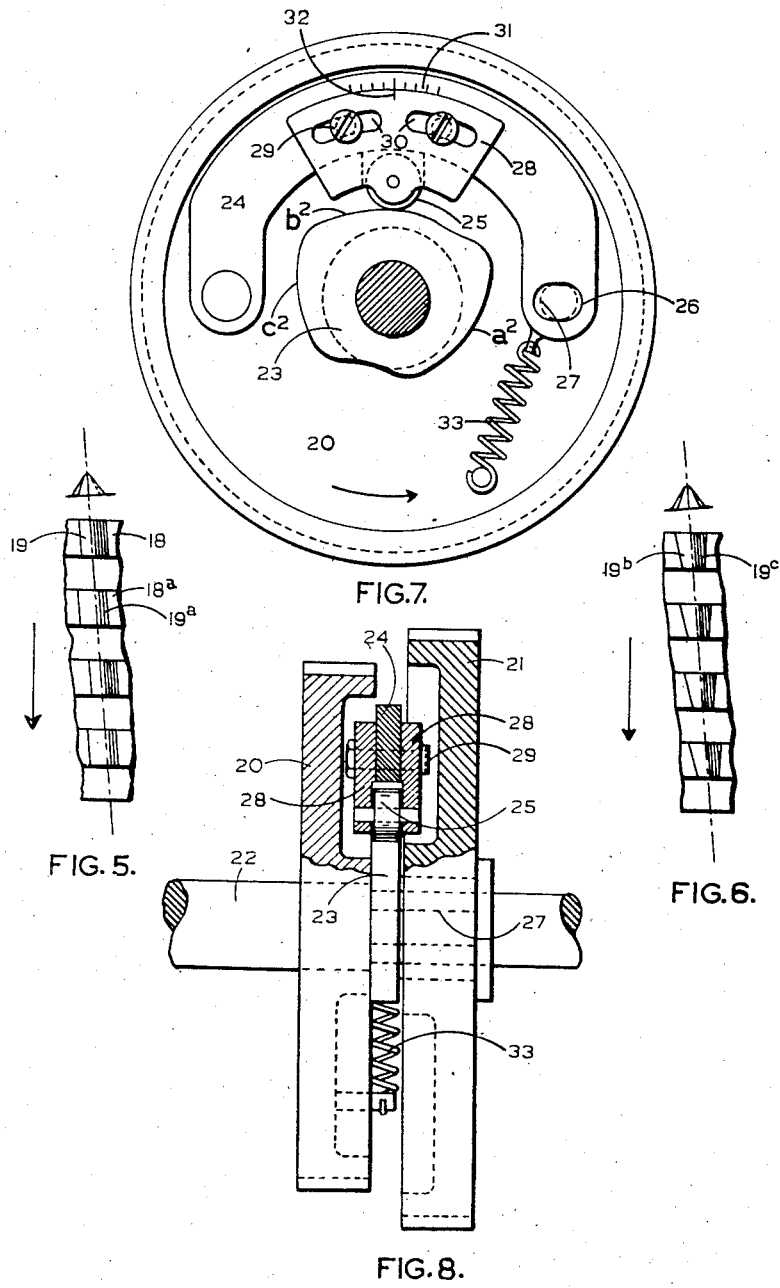

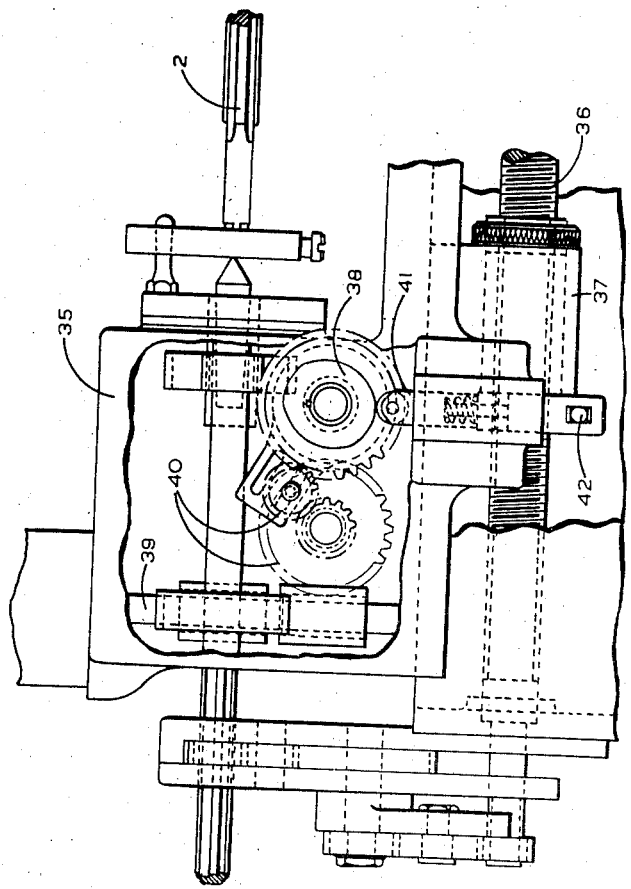
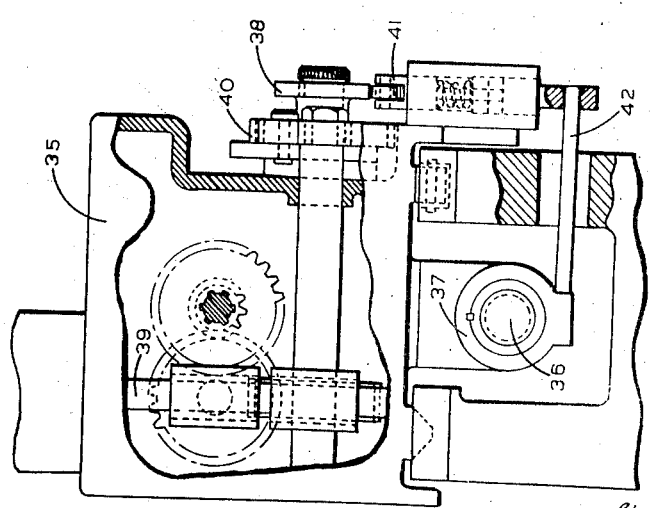

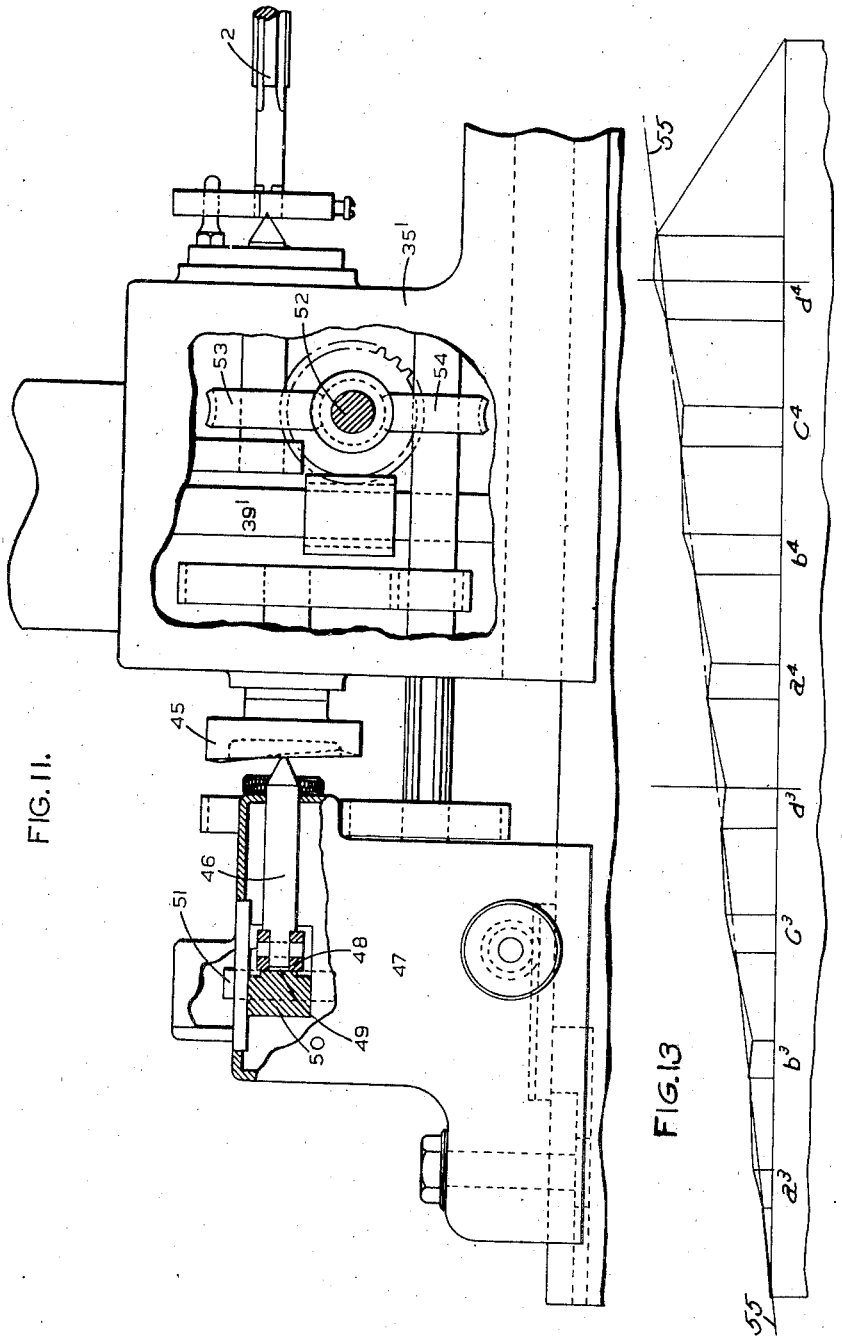

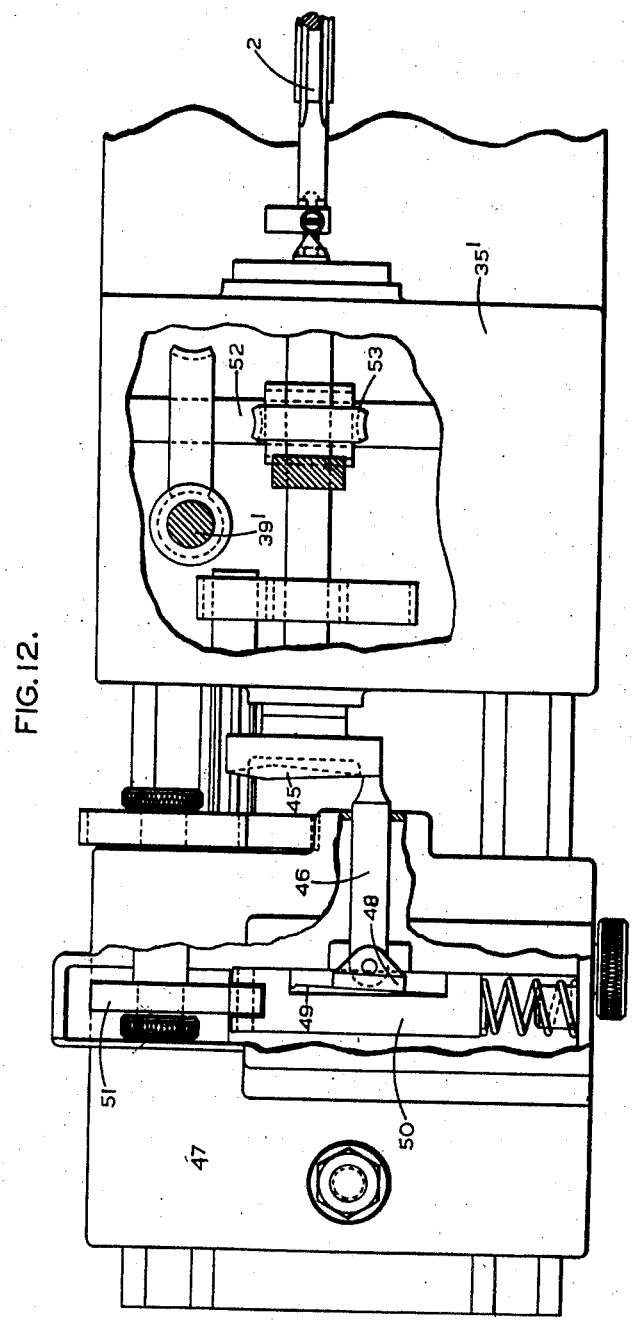

Patented Jan. 26, 1943

2,309,313

UNITED STATES PATENT OFFICE 2,309,313

MEANS FOR PRODUCING RELIEF IN SCREW THREADS

Stanley Jaffa Harley and John Ernest Wainwright, Coventry, England

Application March 11, 1941, Serial No. 382,818
In Great Britain March 2, 1940

10 Claims. (Cl. 10—154)

This invention relates to a new or improved method of and means for producing relief in screw threads and more particularly where, as in screw thread taps and dies, some relief is necessary for cutting purposes. The invention is equally applicable to screw threads produced by a cutting tool as to those produced by a grinding operation.

The orthodox method of relieving taps and dies is to back-off the lands. In some cases, however, relief is obtained by removing each alternate thread.

According to this invention the threads of screw thread taps and dies are either stepped or staggered on the helix so as to cut in combination and succession a full thread form, or have the whole or part of one flank formed to a lesser helix than the mean helix of the thread and/or the other flank formed to a greater helix than said mean.

In the former case the threads are stepped or staggered on the helix by a lateral reduction of one flank of each thread on one land of the tap or die and by a similar reduction of the opposite flank of each thread on the next succeeding land.

In the latter case the whole or part of one or both flanks of each thread on each land of the tap or die is reduced laterally and progressively.

For these purposes the speed of rotation of the tap or die blank relatively to its axial movement or vice versa, is accelerated and retarded between and/or during the grinding or cutting of the threads in the lands thereof.

The nature and degree of relief obtained in this way will in each case depend upon the timing, periodicity and magnitude of the variations in the speed of rotation of the tap or die blank relatively to the speed of its axial traverse, or vice versa.

In the accompanying drawings,

Figures 1 and 2 are front and side views respectively of one form of apparatus for controlling the rotational speed of a tap or die blank for the purposes of the present invention.

Figure 3 is a detail view of the cam shown in Figure 1.

Figure 4 is a detail view of an alternative form of cam.

Figure 5 includes diagrammatic end and plan views of a screw thread which is stepped or staggered on the helix in accordance with one method of relieving screw threads comprised within the present invention.

Figure 6 includes similar views of a screw thread having bi-lateral relief according to the invention.

Figures 7 and 8 are views similar to Figures 1 and 2 of an alternative form of apparatus for controlling the rotational speed of a tap or die blank.

Figures 9 and 10 are two views taken at right angles to each other of apparatus for controlling the speed of the traversing motion of the tap or die blank.

Figures 11 and 12 are elevational and plan views of an alternative form of apparatus for controlling the speed of the traversing motion of the tap or die blank.

Figure 13 is a detail view of the lead cam in its developed form.

According to one way of carrying out the present invention the rotational speed of a fluted screw thread tap or die blank relative to its axial traverse during the screw threading operation may be accelerated and retarded at the times the flutes of the blank are passing the screw thread grinding or cutting tool, and/or during the time the threads are being produced in the lands of the tap or die, according to the nature of the relief required.

One form of apparatus for this purpose is shown in Figures 1 and 2. The tap blank 2 is supported for rotation in the usual way between centres 3, 4 carried by head and tail stocks (not shown) which are carried by a slide or table having a traversing motion across the face of a screw-thread grinding wheel 5 represented in dotted lines in Figure 2. The face plate 6 of the headstock is driven in any suitable manner and, for the purposes of the present invention, transmits its rotary motion to the blank 2 by means of a lever 7. This lever rotates with the face plate but is loosely mounted about the axis thereof so as to be capable of angular movement relatively thereto. One arm of said lever carries a driving peg 8 engaging a driving collar 9 secured to the blank 2. Fixed to a stationary arbor 10 carrying the centre 3 is a gear wheel 11 and in constant mesh with this wheel is a second gear wheel 12 rotatably mounted on a pin 13 fixed to the face plate and carrying a cam 14. The arm aforesaid of the lever 7 carries a roller 15 which is maintained in constant contact with the periphery of the cam by means of a spring 16 attached at one end to the other arm of said lever and at the other end to said face plate. Angular movement of the lever in the opposite direction may be limited by means of a stop 17 on the face plate. The arrangement is such that as the face plate revolves, the cam 14 is rotated by the co-action between the gear wheels 11 and 12. The profile of the cam is such that as it rotates it oscillates the lever about its pivotal axis relatively to the face plate and in this way causes the speed of rotation of the blank 2 to be alternately accelerated and retarded.

The kind and degree of relief which is obtained in this way will be determined in each case by the form and timing of the cam. For example, where it is desired to give progressive lateral relief to all the threads of a four-fluted tap the cam will have a profile substantially as shown more clearly in Figure 3, that is to say, the cam will have four periods $a, b, c, d$ for producing alternate accelerations and decelerations during the rotation of the tap blank. In considering the action of this cam it is necessary to remember that acceleration of the tap reduces the helix angle of the thread and that deceleration increases said angle. The following description relates to the relieving of right hand threads. The invention is, however, equally applicable, of course, to left hand threads. If the cam is rotating in the direction of the arrow in Figure 3 the period $a$ will produce a progressive deceleration of the rotational speed of the tap during the time the first land is being screw threaded and the first flute is passing the thread forming tool. This will give a progressive lateral relief to the leading flank of the thread. The period $b$ will produce a progressive acceleration in the rotational speed of the tap during the time the second land is being screw-threaded and the second flute is passing the thread forming tool. This will give a progressive lateral relief on the following flank of the thread. Similarly, periods $c$ and $d$ will repeat the operations on the leading and following flanks of the threads on the third and fourth lands respectively.

Thin thread forms which are stepped or staggered on the helix so as to cut in combination and succession a full thread form require a different form of cam. For a four fluted tap the cam in this case will be of a shape substantially as shown in Figure 4, i. e. it will have four periods $a^1, b^1, c^1, d^1$. Assuming this cam to be rotating in the direction of the arrow the effect produced will be that during the times the flutes are passing the thread forming tool the rotational speed of the tap blank will be alternately accelerated and decelerated and that during the times the lands are being screw threaded the said rotational speed will remain constant, the roller at these times contacting the intermediate concentric portions $e, f, g, h$ of the cam. The result will be that on one land 18 of the tap one flank 19 of each thread will be reduced laterally and uniformly and on the next succeeding land 18$^a$ the opposite flank 19$^a$ of each thread will be similarly reduced, as represented diagrammatically in Figure 5.

Where it is desired to give each of the threads a bilateral relief the speed of rotation of the fluted tap blank is progressively accelerated or decelerated during the whole or a part of the time the grinding wheel or tool is cutting the threads on the lands of the tap, in such a way that on certain lands the following thread flanks are progressively relieved during one revolution of the tap and on certain other lands the leading flanks of the thread are progressively relieved during the second revolution, or second operation of the tap where this is part of a single tool sequence. That is to say, the whole or part of one flank 19$^b$ of each thread will be ground or cut to a greater helix than the mean helix of the thread and the whole or part of the opposite flank 19$^c$ will be formed to a lesser helix than the said mean, as graphically represented in Figure 6.

The speed controlling means employed for this purpose may be of any suitable kind. For example, as shown in Figures 7 and 8 a driving gear wheel 20 and a driven gear wheel 21 are mounted on an arbor 22 to which is fixed a suitable cam 23. The driving gear 20, which may itself be driven in any suitable manner, carries a lever 24 pivoted at one end thereto and having a roller 25 or a stylus engaging the cam. The other end of the lever is slotted at 26 to engage a pin 27 on the driven gear 21 which is in operative driving connection with the tap blank. As the driving gear rotates and the lever is moved about its pivot under the influence of the cam, the speed of rotation of the driven gear wheel will be varied.

In this case the cam periods are not a common multiple of the flutes or lands of the tap. For example, in the case of a tap having four flutes the cam, as seen in Figure 7, has three periods $a^2, b^2, c^2$ of which $a^2$ and $b^2$ are fast and $c^2$ slow, or vice versa. The lever gear rotates at a speed ratio of 1⅓ to 1 of the tap blank, the driving gear wheel 20 being geared up to maintain correct ratio with the traversing motion of the tap relative to the pitch of the thread to be formed therein. If the lever gear is rotating in the direction of the arrow the period $a^2$ will cause a quick progressive acceleration in the rotational speed of the tap whilst the grinding wheel is cutting the threads in the first land. The second period $b^2$ will produce a similar quick acceleration during the cutting of the second land. The third period will then produce a slow deceleration whilst the third land is being screw threaded after which the first period $a^2$ will again come into operation to cause a quick acceleration during the cutting of the fourth land, and so on. The arrangement is such that with a multi-ribbed screw thread grinding wheel or tool chaser the bi-lateral relief will be produced on the flanks of the thread at the third revolution of the tap. As will be seen the cam is formed so that the change of speed of rotation of the tap blank between progressive acceleration and deceleration takes place whilst the flutes of the tap are passing the grinding wheel or chaser, i. e. when the tap is not engaged with the latter.

The degree of acceleration and deceleration in the rotational speed of the tap blank may be varied in any suitable manner. For example, as shown in Figure 7, the roller 25 is carried by plates 28 which are adjustable on the lever 24 by means of screws 29 and slots 30, and the degree of adjustment may be determined by means of calibrations 31 on the lever and an index mark 32 on one of the said plates. The roller is maintained in contact with the cam at all times by means of a spring 33 attached to the wheel 20 and acting on the slotted end of the lever.

In the above described arrangement the relief is produced in each case by varying the rotational speed of the tap blank relatively to its traversing or axial movement which remains constant and determines the pitch of the thread. Similar relief may, however, be obtained by rotating the tap at a constant speed and varying the traversing or axial movement of the tap relatively thereto. Where, for example, as shown in Figures 9 and 10, the work-head 35, from which the tap blank 2 is supported and rotated, is traversed on the machine bed in a direction parallel with the axis of rotation by means of a lead screw 36, the sleeve nut 37 which engages the latter is mounted so as to be capable of rotation but not of movement endwise in said work-head, and means are provided for advancing and retarding the angular position thereof with respect to said lead screw for the purpose of accelerating and decelerating the traverse of the tap blank across the face of the screw thread grinding wheel. In the arrangement shown the said means includes the employment of a cam 38 which is driven from the input power shaft 39 through change speed gear 40 and operates upon a spring-loaded plunger 41 the lower end of which engages an arm 42 fixed to the nut 37. The tap blank which is mounted between centres as usual is also driven from the input shaft and its speed is correlated with that of the lead screw.

Here also the profile of the cam will vary and depend upon the nature and degree of the relief required. Where, for example, it is required to produce a lateral reduction on the leading and following flanks of the thread a four-fluted tap alternately, the contour of the cam will be substantially the same as that shown in Figure 4. That is to say it will have four periods $a^1$, $b^1$, $c^1$, $d^1$ separated by concentric periods $e$, $f$, $g$, $h$. The periods $a^1$, $c^1$ have each a progressively increasing radius and the periods $b^1$, $d^1$ a progressively decreasing radius. The cam is timed in relation to the rotation of the tap blank so that the traversing motion of the latter will be alternately accelerated and decelerated during the times the flutes of the blank are passing the screw thread grinding wheel and will remain constant during the times the lands of the blank are being screw threaded. That is to say, when either of the periods $a^1$ or $c^1$ is in active operation on the plunger 41 the nut 37 will be turned relatively to and in the same direction as the lead screw 36, thereby retarding the traverse of the work-head. Conversely, when either of the periods $b^1$ or $d^1$ is in active operation on the said plunger the nut will be turned relatively to but in the opposite direction to the lead screw thereby advancing the traverse of the work-head. The effect produced will be that in the former case the following flank of the thread will be reduced laterally during the thread forming operation and in the latter case the leading flank will be similarly reduced.

The use of a leadscrew and nut for traversing the work-head may, however, be dispensed with and their function performed by means of a cam. An arrangement of this kind is shown in Figures 11 and 12 in which it will be seen that the work-head $35^1$, which supports and drives the tap blank 2, is arranged to be traversed along the bed of the machine towards the right hand and against the action of a counterweight or spring (not shown) by means of a face or lead cam 45 carried by and rotatably mounted in the work-head, and co-operating with a stylus 46 slidably mounted in a stationary head 47. The inner end of this member is fitted with a pivoted shoe 48 bearing against an inclined surface 49 carried by a spring-loaded plunger 50, the movement of which is controlled by a second or relief cam 51. The contour of the relief cam will determine the timing and degree of acceleration or deceleration in the speed of the traversing motion of the work-head and may either be of substantially the form shown in Figure 4 or in Figure 7 according as the relief is to be staggered or bi-lateral.

The work-head spindle, lead cam and relief cam are all driven from the power input shaft $39^1$ by means of a cross-shaft 52 and worm gears 53, 54, and their speeds are therefore correlated with each other and in such a manner as to produce the required relief.

The arrangement is such that the co-action between the rotating lead cam 45 on the movable head $35^1$ and the stylus 46 carried by the fixed head 47 imparts a traversing motion to the tap blank 2 in an axial direction during the rotation of the latter. The axial position of the stylus 46 in the fixed head at any moment is controlled by the relief cam 51 and the inclined surface 49 on the plunger 50. The profiles and timing of the said relief cam 51 will vary according to the nature and degree of the relief it is desired to give to the threads of the tap or die. For example, the said cam may be formed and timed so as to cause alternate acceleration and deceleration in the traversing motion of the tap blank during the times the flutes thereof are passing the grinding wheel or other thread forming tool. The effect of this will be to produce thin thread forms which are stepped or staggered on the helix so as to cut in combination and succession a full thread form substantially similar to that above described with reference to the arrangement shown in Figures 1 and 2.

Alternatively, the said cam 51 may be formed and timed so that the traversing motion of the tap blank is progressively accelerated whilst the grinding wheel or tool is cutting the threads in certain lands of the tap and decelerated in a similar manner during the cutting of the threads on other lands of the tap, the effect produced in this case being that all the threads are given a bi-lateral relief, i. e., one flank of each thread will be ground or cut to a greater helix than the mean helix of the thread and the opposite flank will be ground or cut to a lesser helix than said means. Alternatively, the stylus 46 may be fixed in the stationary head and a separate relief cam dispensed with. In this case the contour of the lead cam for a four fluted tap will be as shown in its developed form in Figure 13, in which the mean helix of the thread is represented by the dotted line 55 whilst $a^3$, $b^3$, $c^3$, $d^3$ represents those portions of the cam which are in operation during the times the lands of the tap are being screw threaded. If the cam is rotating in the direction of the arrow it will be seen that during the time the first flute is passing the grinding wheel the speed of the traversing motion of the tap remains normal, the contour of the cam during this time following the mean helix. During the screw-threading of the first land of the tap the axial traversing motion thereof is accelerated by the portion $a^3$ of the cam to relieve the leading flank of the thread. The speed of the traversing motion is then decelerated back to normal as the second flute passes the grinding wheel. During the threading of the second land the speed of the traversing motion is decelerated below the normal by the action of the portion $b^3$ of the cam to relieve the following flank of the thread. In a similar manner the traversing motion is alternately accelerated and decelerated by the portions $c^3$ and $d^3$ during the screw-threading of the third and fourth lands, the threads of which are relieved at the leading and following flanks respectively. During the second complete revolution of the tap, the order of acceleration and deceleration is reversed, that is to say, during the screw threading of the first and third lands the portions $a^4$, $c^4$ of the cam decelerate the traversing motion, acceleration taking place during the threading of the second and fourth lands by the action of the cam portions $b^4$, $d^4$. The cam returns to zero during the third revolution of the tap. By suitable modification of the cam profile it will be understood that progressive lateral relief may be given to only one flank of the thread and that in either case the relief may extend either to the full length of the thread on each land or to a part only of such length.

It will also be understood that the invention includes any desired combination of the kinds of relief above described. For example, in addition to the stepped or staggered relief the threads may also be given a progressive relief on one or both flanks, as desired.

The relieved tap or other screw-threaded tool may be produced according to this invention at a single grinding or cutting operation by means of a multi-ribbed grinding wheel or tool and the laterally relieved threads will have concentric core and major diameters. If desired, the relief can be limited to one flank only of each thread.

Alternatively, the tap or the like could, of course, be produced by multiple cuts using a single-ribbed grinding wheel or cutting tool and dividing out or relocating the work-piece.

We claim:

1. Apparatus for producing relief in screw thread taps and dies comprising a work-head adapted to support and rotate the tap or die, means for traversing said head in a direction parallel with the rotational axis of said tap or die, thread-forming means for producing a screw thread on the lands of said tap or die, a cam for accelerating and retarding the speed of rotation of said tap or die relatively to the traverse of said work-head, and means for operating said cam.

2. Apparatus for producing relief in screw thread taps and dies comprising a work-head adapted to support and rotate the tap or die, means for traversing said head in a direction parallel with the rotational axis of said tap or die, thread-forming means for producing a screw thread on the lands of said tap or die, a cam for accelerating and retarding the speed of the traversing motion of said work-head relatively to the speed of rotation of said tap or die, and means for operating said cam.

3. Apparatus for producing relief in screw thread taps and dies comprising a work-head adapted for mounting on the bed or table of a machine for producing screw threads, a lead screw for traversing said work-head along said bed or table, a sleeve nut mounted to rotate but not to move endwise in said work-head and engaging said lead screw, and means for advancing and retarding the angular position of said nut with respect to said lead screw.

4. Apparatus for producing relief in screw thread taps and dies comprising a work-head adapted for mounting on the bed or table of a machine for producing screw threads, a lead screw for traversing said work-head along said bed or table, a sleeve nut mounted to rotate but not to move endwise in said work-head and engaging said lead screw, a cam for advancing and retarding the angular position of said nut with respect to said lead screw and means for operating said cam.

5. Apparatus for producing relief in screw thread taps and dies comprising a work-head adapted for mounting upon the bed or table of a machine for producing screw threads, a cam for traversing said work-head along said bed or table, and means for advancing and retarding the action of said cam on said work-head.

6. Apparatus for producing relief in screw thread taps and dies comprising a work-head adapted for mounting upon the bed or table of a machine for producing screw threads, a cam for traversing said work-head along said bed or table and a second cam for advancing and retarding the action of the first cam on said work-head.

7. Apparatus for producing relief in screw thread taps and dies comprising a rotatable face plate for supporting the tap or die blank, a lever loosely pivoted about the axis of said face plate and in driving connection with said blank, and means for advancing and retarding the angular position of said lever with respect to the rotary motion of said face plate.

8. Apparatus for producing relief in screw thread taps and dies comprising a rotatable face plate for supporting the tap or die blank, a lever loosely pivoted about the axis of said face plate and in driving connection with said blank, and a cam rotatably mounted on said face plate for advancing and retarding the angular position of said lever with respect to the rotary motion of said face plate.

9. Apparatus for producing relief in screw thread taps and dies comprising a driving gear wheel, a loosely mounted gear wheel for rotating the tap or die blank, and means for advancing and retarding the angular position of the driven gear wheel with respect to the driving gear wheel.

10. Apparatus for producing relief in screw thread taps and dies comprising a driving gear wheel, a loosely mounted gear wheel for rotating the tap or die blank, and a cam for advancing and retarding the angular position of the driven gear wheel with respect to the driving gear wheel.

STANLEY JAFFA HARLEY.
JOHN ERNEST WAINWRIGHT.